J. A. QUINLAN.
CHUCK.
APPLICATION FILED DEC. 15, 1913.
1,095,672.
Patented May 5, 1914.
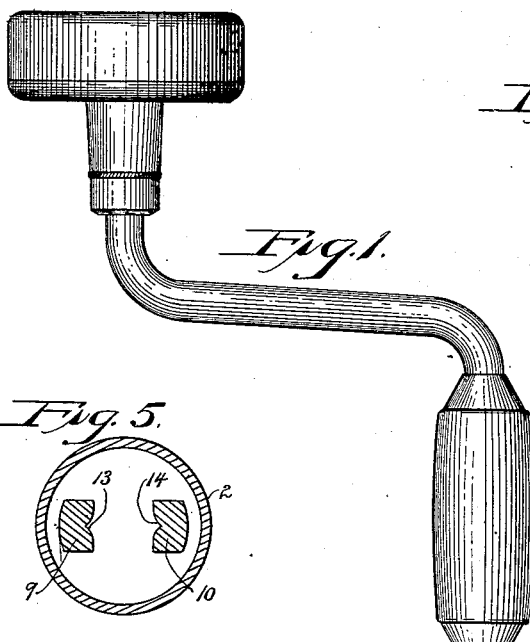
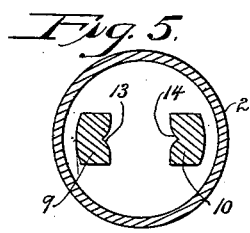
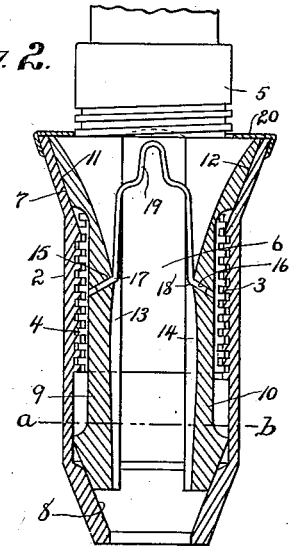
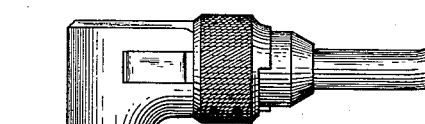
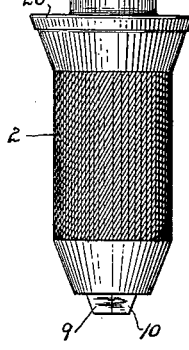
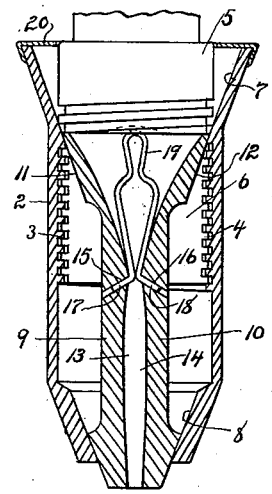

UNITED STATES PATENT OFFICE.

JAMES A. QUINLAN, OF SOUTHINGTON, CONNECTICUT.

CHUCK.

1,095,672.  Specification of Letters Patent.  Patented May 5, 1914.

Application filed December 15, 1913. Serial No. 806,798.

*To all whom it may concern:*

Be it known that I, JAMES A. QUINLAN, a citizen of the United States, residing at Southington, in the county of Hartford and State of Connecticut, have invented a new and useful Improvement in Chucks; and I do hereby declare the following, when taken in connection with the accompanying drawings and the characters of reference marked thereon, to be a full, clear, and exact description of the same, and which said drawings constitute part of this application, and represent, in—

Figure 1 a side view of a bit brace provided with a chuck constructed in accordance with my invention. Fig. 2 a sectional view of the chuck shown as applied to the outer end of the shank of a brace or other similar holder, showing the jaws in their retired position. Fig. 3 a similar view showing the jaws in the contracted position. Fig. 4 a sectional view at right angles to that shown in Fig. 3. Fig. 5 a sectional view on the line *a—b* of Fig. 2.

This invention relates to an improvement in chucks, and particularly to chucks employed with bit braces, breast drills, etc., the object being to form a chuck by which bits having round shanks may be firmly held, as well as bits with square shanks; and the invention consists in a chuck having certain details of construction and combinations of parts as will be hereinafter described and particularly recited in the claim.

In carrying out my invention, I employ a shell 2 having internal threads 3 adapted to engage with threads 4 on the shank 5 of a bit brace, breast drill or other device, the shank being provided with a clearance notch 6 in the usual manner. At the rear or inner end the interior of this shell is formed with an inclined or cam surface 7, and at its outer end the interior wall 8 is also beveled, preferably at the same angle as the inner end, but of smaller diameter. The jaws 9 and 10 are provided at opposite ends with inclined surfaces 11, 12, corresponding to the tapered surfaces 7 and 8 in the shell, and so that the jaws have bearing at opposite ends whereby they are maintained in parallel position. The adjacent faces of these jaws are respectively formed with longitudinal grooves 13 and 14, and preferably and as shown in Fig. 5 of the drawings, the adjacent faces of the jaws are slightly concaved. These jaws are also formed respectively with perforations 15, 16, which are inclined from the rear forward and located about midway of the length of the jaws to receive the ends 17 and 18 of a bowed spring 19 which tend to separate the jaws in the usual manner of bit braces.

As herein shown, the rear end of the shell is closed by a cap 20. The chuck is operated in the same way as usual in chucks of this character, namely, by screwing the shell upon the shank and so as to either draw the shell upon the ends of the jaws so as to crown them together against the bit inserted between them, or to move away from the jaws so as to allow them to separate, except with my improved form of shell and jaws both ends of the jaws are guided so that both ends move together and remain parallel.

I claim—

A chuck comprising an externally threaded and notched shank, a shell threaded between its ends for engagement with the threads on the shank, the outer end of said shell tapered inward, the inner end of said shell tapered outward, a pair of jaws located in the notches in said shank beyond which they project, the outer ends of the jaws beveled corresponding to the bevel at the outer end of the shell, the inner ends of the jaws beveled corresponding to the bevel of the inner end of the shell, and a spring between the jaws and adapted to force them apart.

In testimony whereof, I have signed this specification in the presence of two subscribing witnesses.

JAMES A. QUINLAN.

Witnesses:
RICHARD ELLIOTT,
THOMAS F. WELCH.

Copies of this patent may be obtained for five cents each, by addressing the "Commissioner of Patents, Washington, D. C."